(12) United States Patent
Kozak et al.

(10) Patent No.: US 8,955,660 B2
(45) Date of Patent: Feb. 17, 2015

(54) HUB, IN PARTICULAR FOR REAR BICYCLE WHEEL

(75) Inventors: Mariusz Kozak, Swidnik (PL); Janusz Kozak, Swidnik (PL)

(73) Assignees: Soul-Kozak, Swidnik (PL); Mariusz Kozak, Swidnik (PL)

( * ) Notice: Subject to any disclaimer, the term of this patent is extended or adjusted under 35 U.S.C. 154(b) by 739 days.

(21) Appl. No.: 13/206,958

(22) Filed: Aug. 10, 2011

(65) Prior Publication Data
US 2012/0048671 A1    Mar. 1, 2012

(30) Foreign Application Priority Data
Aug. 26, 2010 (PL) .................................. P-392232

(51) Int. Cl.
  *F16D 41/24* (2006.01)
  *F16D 41/36* (2006.01)
  *B60B 27/04* (2006.01)

(52) U.S. Cl.
  CPC .............. *F16D 41/36* (2013.01); *B60B 27/047* (2013.01); *B60Y 2200/13* (2013.01)
  USPC .............................. 192/64; 301/110.5; 192/46

(58) Field of Classification Search
  USPC ....................................................... 192/84.93
  See application file for complete search history.

(56) References Cited

U.S. PATENT DOCUMENTS

| 6,588,564 | B1 * | 7/2003 | Jager et al. | 192/64 |
| 7,318,508 | B2 * | 1/2008 | Hamasaki et al. | 192/38 |
| 2004/0045783 | A1 * | 3/2004 | Lew et al. | 192/64 |
| 2008/0006500 | A1 * | 1/2008 | Spahr | 192/64 |
| 2008/0200292 | A1 * | 8/2008 | Goring | 474/116 |
| 2009/0255774 | A1 * | 10/2009 | Hsu | 192/64 |

* cited by examiner

*Primary Examiner* — Gene Crawford
*Assistant Examiner* — Mark Manley
(74) *Attorney, Agent, or Firm* — Westman, Champlin & Koehler, P.A.; Z. Peter Sawicki; Amanda Prose

(57) ABSTRACT

Wheel hub, in particular bicycle rear wheel hub, comprising hub shell and freewheel shell both supported by bearings to be rotatable relative to the hub axle, where the hub shell is slidingly coupled through spline coupling with a freewheel coupling ring provided with axial pawl teeth on its axial face, wherein an annular permanent magnet (6) is seated in the freewheel coupling ring (3), and another permanent magnet (5) is arranged coaxial to the permanent magnet (6) in the hub shell (1), while the axial pawl teeth (B) of the freewheel coupling ring (3) intermesh with the axial pawl teeth (C) of the freewheel shell (4), and also the inner ring of the bearing (7*a*) disposed in the hub shell (1) abuts against a hub axle (2) collar (16) and the outer ring of the bearing (7*a*) is urged towards the said hub axle (2) collar (16) by an adjusting screw (10) screwed in the hub shell (1) from the non-drive side, while the inner ring of the bearing (7*b*) abuts against the hub axle collar (17) and its outer ring abuts on the other side against the axial lip (18) in the hub shell (1) interior, and from the drive side of the hub, the axial face of spacer sleeve (14) abuts against the bearing (7*d*) and whose other axial face abuts against the collar of the end-cup (9) received in the hub axle (2) bore.

6 Claims, 3 Drawing Sheets

HUB, IN PARTICULAR FOR REAR BICYCLE WHEEL

CROSS-REFERENCE TO RELATED APPLICATION

The present application claims priority from Polish Patent Application No. P-392232, filed on Aug. 26, 2010, in the Polish Intellectual Property Office, the content of which is hereby incorporated by reference in its entirety.

BACKGROUND

The subject of the invention is a hub, in particular for a rear bicycle wheel.

So far, rear wheel hubs have been used having freewheels with 3 or 6 pawls which mesh with the toothed surface of an inner toothed disc. There is disclosed in the U.S patent application No. US20080006500 the description of a rear wheel hub having a hub shell and a freewheel shell which are rotatably supported by two bearings relative to a hub axle. The hub shell is slidingly coupled through spline coupling with a ring disc provided with frontal toothing which intermesh with the toothing of identical freewheel coupling ring spline coupled with the freewheel shell, while the rings are urged towards one another by springs.

SUMMARY

The essential feature of the invention is that an annular permanent magnet is disposed in the freewheel coupling ring which is slidingly coupled through spline coupling with the hub shell and which is provided with axial pawl teeth that intermesh with the axial pawl teeth of the freewheel shell. Another annular permanent magnet disposed against a circular lip is axially arranged to the said permanent magnet such that both magnets are arranged with identical poles towards each other. The freewheel coupling ring has preferably from 26 to 36 axial pawl teeth and the ratio of the outer diameter of the said axial pawl teeth B to the inner diameter of the said axial pawl teeth B is at most 1.4:1. The freewheel shell is a one-piece element.

The inner ring of the first hub shell bearing is seated against a hub axle collar and the outer ring of the said hub shell bearing is urged towards the said hub axle collar by an adjusting screw screwed in the hub shell from the non-drive side. The inner ring of the other hub shell bearing is disposed against the other hub axle collar and its outer ring is disposed against the axial face of the hub shell inner circular lip.

The outer ring of the first freewheel shell bearing is seated against the axial face of the freewheel shell inner lip. From the drive side, the axial face of a spacer sleeve is seated against the inner ring of the second freewheel shell bearing and the other axial face of the said spacer sleeve is secured in place with the axial collar of an end-cap inserted into the hub axle bore. An end-cap identical to the end-cap securing the said spacer sleeve is inserted into the hub axle bore from the hub shell side.

It is an advantage of the present invention to provide a hub which does not require servicing. The freewheel coupling ring is urged towards the freewheel shell by magnetic field of the permanent annular magnets. Hub axial play can be adjusted with one adjusting screw.

BRIEF DESCRIPTION OF THE DRAWINGS

An embodiment of the rear wheel hub according to the invention will now be described with reference to the accompanying drawings, wherein.

DETAILED DESCRIPTION OF ILLUSTRATIVE EMBODIMENTS

Figure 1:
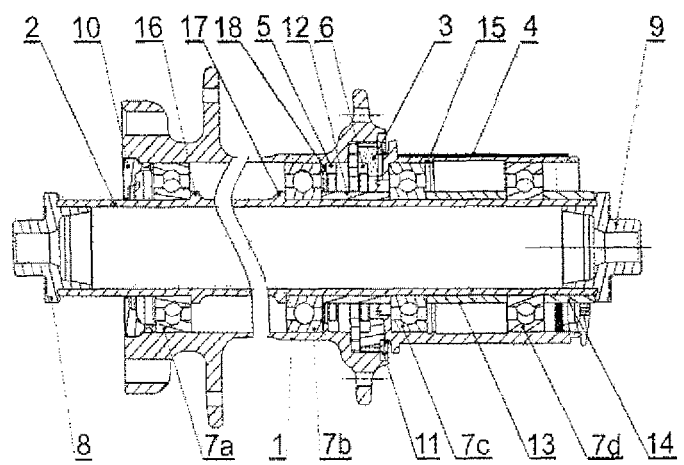
FIG. 1 is a cross section of a rear wheel hub according to the invention.
Figure 2:
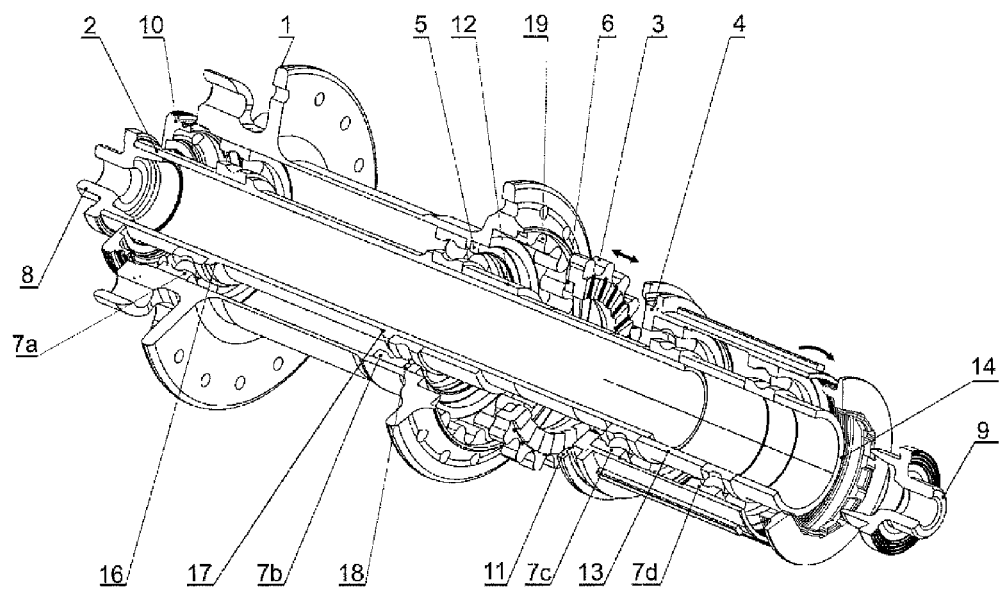
FIG. 2 is an exploded view in perspective with partial section of the hub according to FIG. 1.

Hub shell 1 is rotatably supported relative to the hub axle 2 via bearings 7a and 7b. The inner ring of the bearing 7a is seated against the hub axle collar 16 and the outer ring of the bearing 7a is urged towards the said collar 16 via an adjusting screw 10 screwed in the hub shell 1 from the non-drive side. The inner ring of the bearing 7b is seated against the hub axle 2 collar 17 while its outer ring is seated on the other side against the axial face of the hub shell 2 circular lip 18. On the hub axle 2, a cylindric, one-piece freewheel shell 4 is rotatably supported by bearings 7c and 7d, and also a spacer sleeve 12 is disposed between the inner rings of the bearings 7b and 7c and a spacer sleeve 13 is disposed between the inner rings of bearings 7c and 7d. On the other side, the inner ring of the bearing 7d is seated against the axial face of the spacer sleeve 14 against which abuts the collar of the end-cap 9 inserted into the hub axle 2 bore. The outer ring of the bearing 7c is seated against the axial face of the freewheel shell 4 inner lip. A seal 11 is disposed between the hub shell 1 and the freewheel shell 4.

The hub shell 1 interior from the bearing 7b is provided with inner splines 19 disposed evenly axially. The inner splines 19 intermesh with the outer splines A of the freewheel coupling ring 3 which is received axially slidingly in the hub shell 1. The ratio of the outer diameter of the axial pawl teeth B to the inner diameter of the axial pawl teeth B is at most 1.4:1. The freewheel coupling ring 3 is provided with 26 to 36 pawl teeth B arranged axially evenly. On the other side of the axial pawl teeth B, an annular permanent magnet 6 is disposed in the freewheel coupling ring 3. The second annular permanent magnet 5 is disposed in the hub shell 1 interior, behind the inner splines 19, opposite and axially facing the permanent magnet 6. The permanent magnets 5 and 6 are arranged with identical poles facing each other. Axial pawl teeth C identical to the axial pawl teeth B of the freewheel ring 3 are provided on the axial wall of the freewheel shell 4 from the side of the freewheel coupling ring 3. An end-cap 8 identical to the end-cap 9 is inserted in the other end of the hub axle 2 bore.

The freewheel ring 3 is urged towards the axial face of the freewheel shell 4 with the force of the magnetic field with which the permanent magnets 5 and 6 repulse one another. When the freewheel shell 4 is in clockwise, drive rotation, the engaged freewheel coupling ring 3 transmits the drive torque to the hub shell 1. When the freewheel shell 4 is in anti-clockwise, non-drive rotation, the axial pawl teeth B of the freewheel coupling ring 3 axially diverge from the axial pawl teeth C, thus causing the freewheel ring 3 to perform reciprocating motion as a result of sliding of the axial pawl teeth B tips on the oblique axial flank of the axial pawl teeth C.

The force exerted by the end-cap 9 on the spacer sleeve 14 is transferred via the bearing 7*d*, the spacer sleeve 13, the bearing 7*c*, the spacer sleeve 12 onto the bearing 7*b* urging it towards the hub axle collar 17. The adjusting screw 10, after setting against the bearing 7*a* outer ring causes, through the hub shell 2, urging of the bearing 7*b* against the hub axle collar 17, thus resulting in the loss of unwanted axial play of the assembly.

The bearing 7*c* outer ring is secured by known means, e.g. as a tightly fitting element or, as it is the case in this embodiment of the invention, the use of a seating ring 15.

Figures 3, 3A, 3B:
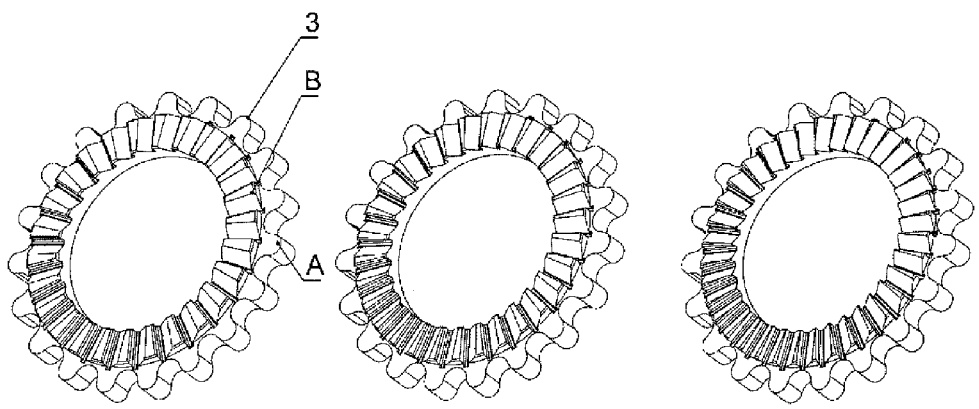
FIG. 3 is a view in perspective of a freewheel coupling ring provided with 26 axial pawl teeth B.
FIG. 3a is a view in perspective of a freewheel coupling ring provided with 30 axial pawl teeth B.
FIG. 3b is a view in perspective of a freewheel coupling ring provided with 36 axial pawl teeth B.
Figure 4:
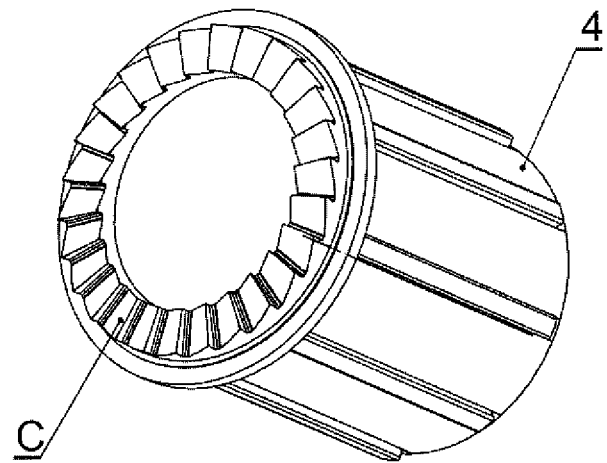
FIG. 4 is a view in perspective of the freewheel shell and FIG. 5 is a detailed view of the permanent annular magnets arrangement in the hub.
Figure 5:
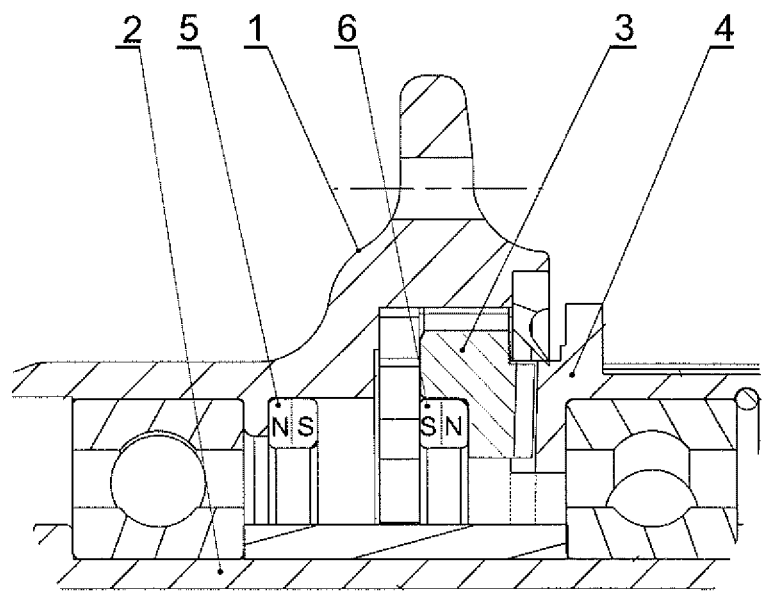

In an alternative embodiment of the invention (FIG. 3*a*), the freewheel coupling ring (3) has on its axial face 30 axial pawl teeth B. In another alternative embodiment of the invention (FIG. 3*b*), the freewheel coupling ring (3) has on its axial face 36 axial pawl teeth B.

What is claimed is:

1. A wheel hub, in particular bicycle rear wheel hub, comprising hub shell and freewheel shell both supported by bearings to be rotatable relative to the hub axle, where the hub shell is slidingly coupled through spline coupling with a freewheel coupling ring provided with axial pawl teeth on its axial face, wherein an annular permanent magnet is seated in the freewheel coupling ring, and another permanent magnet is arranged coaxial to the annular permanent magnet in the hub shell, while the axial pawl teeth of the freewheel coupling ring intermesh with axial pawl teeth of the freewheel shell, and also an inner ring of a first bearing disposed in the hub shell abuts against a hub axle collar and an outer ring of the first bearing is urged towards the said hub axle collar by an adjusting screw screwed in the hub shell from a non-drive side, while an inner ring of a second bearing abuts against the hub axle collar, and the outer ring of the second bearing abuts on an opposing side against an axial lip in a hub shell interior, and a third bearing outer ring abuts against an axial face of a freewheel shell inner lip, while from the drive side of the hub, an axial face of spacer sleeve abuts against the third bearing and the spacer sleeve other axial face abuts against a collar of an end cap received in a hub axle bore.

2. The wheel hub according to claim 1, wherein the permanent magnets are configured such that they face one another with identical poles.

3. The wheel hub according to claim 1, wherein the freewheel shell is manufactured as a one-piece element.

4. The wheel hub according to claim 1, wherein a second end-cap, identical to the end-cap received in the hub axle bore is inserted in the axle bore from a hub shell side.

5. The wheel hub according to claim 1, wherein a number of axial pawl teeth on the axial face of the freewheel coupling ring is in a range from 26 to 36.

6. The wheel hub according to claim 1, wherein a ratio of an outer diameter of the axial pawl teeth to the inner diameter of the axial pawl teeth is at most 1.4:1.

* * * * *